United States Patent [19]

Hori

[11] Patent Number: 5,636,864

[45] Date of Patent: Jun. 10, 1997

[54] AIR BAG APPARATUS FOR A PASSENGER SEAT

[75] Inventor: Seiji Hori, Niwa, Japan

[73] Assignee: Kabushiki Kaisha Tokai-Rika-Denki-Seisakusho, Aichi-ken, Japan

[21] Appl. No.: 552,779

[22] Filed: Nov. 3, 1995

[30] Foreign Application Priority Data

Dec. 20, 1994 [JP] Japan .................................. 6-316677
Sep. 4, 1995 [JP] Japan .................................. 7-226716

[51] Int. Cl.⁶ .................................................. B60R 21/32
[52] U.S. Cl. .................................... 280/735; 180/273
[58] Field of Search ........................... 280/735; 180/273

[56] References Cited

U.S. PATENT DOCUMENTS

| 5,454,591 | 10/1995 | Mazur et al. | 280/735 |
|---|---|---|---|
| 5,468,014 | 11/1995 | Gimbel et al. | 280/735 |
| 5,474,327 | 12/1995 | Schousek | 280/735 |
| 5,515,933 | 5/1996 | Meyer et al. | 180/273 |
| 5,528,698 | 6/1996 | Kamei et al. | 280/735 |
| 5,531,472 | 7/1996 | Semchena et al. | 280/735 |

FOREIGN PATENT DOCUMENTS

| 0 650 869 A1 | 5/1995 | European Pat. Off. . |
|---|---|---|
| 41 28 608 A1 | 3/1992 | Germany . |
| 44 26 677 A1 | 2/1995 | Germany . |
| 1-285440 | 11/1989 | Japan . |
| 2-60858 | 3/1990 | Japan . |
| 3-96456 | 4/1991 | Japan . |
| 4-103452 | 4/1992 | Japan . |
| 4-166456 | 6/1992 | Japan . |
| 5-213144 | 8/1993 | Japan . |

OTHER PUBLICATIONS

Research Disclosure, No. 357, 1 Jan. 1994, page 50 XP 000425363 'Hardware System and Logic for a Tunable Sir System'.

Automotive Engineering, vol. 103, No. 5, 1 May 1995, p. 64/65 XP 000505532 'Occupant Detection Improves'.

Primary Examiner—Kenneth R. Rice
Attorney, Agent, or Firm—Oliff & Berridge

[57] ABSTRACT

An air bag apparatus for a front or rear passenger seat includes a child restraining system detecting device for detecting whether a child restraining system is mounted on the passenger seat by detecting whether a webbing retractor is in an automatic locking retractor mode or an emergency locking retractor mode, and an inflator controller which prevents an inflator for expanding an air bag body from operating when it is detected by the child restraining system detecting device that the child restraining system is mounted on the passenger seat. Accordingly, the operation of the air bag apparatus is prevented when the child restraining system is used.

17 Claims, 9 Drawing Sheets

AIR BAG APPARATUS FOR A PASSENGER SEAT

BACKGROUND OF THE INVENTION

1. Field of the Invention

The present invention relates to an air bag apparatus for a passenger seat such as a front passenger seat or a rear passenger seat, and more particularly to an air bag apparatus for a front or rear passenger seat on which a child restraining system (CRS) can be mounted.

2. Description of the Related Art

Some vehicles are provided with an air bag apparatus which protects a passenger sitting in the front passenger seat in case of emergency. Japanese Patent Application Laid-Open No. 2-60858 discloses an example of such an air bag apparatus.

As shown in FIG. 5, in the air bag apparatus for a front passenger seat disclosed in the aforementioned patent publication, an opening 74 for allowing an air bag 76 to expand is formed in a dashboard 70 at a position opposite the chest 72A of a passenger 72. When an inflator is operated by an acceleration sensor during an abrupt deceleration of the vehicle, the air bag 76 expands (or inflates) toward the passenger 72 through the opening 74.

Although such an air bag apparatus is effective when the passenger 72 sitting on the front passenger seat 78 is larger than a predetermined size, i.e., the passenger 72 is an adult, it is not so effective when a child sits in a child restraining system (CRS) mounted on a seat cushion 78A of the front passenger seat 78. Because the child is sufficiently restrained by the CRS which is securely restrained by a webbing of a seat belt system of the vehicle, it may not be necessary to expand the air bag. However, in the conventional air bag apparatus, the air bag expands even when a child is in the seat.

A passenger can be protected even when the conventional air bag apparatus is modified such that a reference value for detecting an abrupt deceleration of the vehicle and expanding the air bag 76 is increased when the webbing has been applied to the passenger as compared to a case in which the webbing has not been applied to the passenger. However, in the conventional air bag apparatus, the air bag expands when the deceleration of the vehicle reaches a preset reference value, whether the webbing has been applied to the passenger 72 or not.

Accordingly, the probability of having to replace air bag apparatuses after traffic accidents becomes high, which unnecessarily increases repair costs.

SUMMARY OF THE INVENTION

The present invention has been accomplished by taking the above-mentioned facts into consideration, and an object of the present invention is to provide an air bag apparatus for a front or rear passenger seat which can reduce the likelihood of having to replace the air bag apparatus after a traffic accident, thereby decreasing repair costs.

An air bag apparatus for a passenger seat according to a first aspect of the present invention comprises child restraining system detecting means for detecting whether a child restraining system is mounted on the passenger seat, and an inflator controller for preventing an inflator for expanding an air bag body from operating when the child restraining system detecting means detects that the child restraining system is mounted on the passenger seat.

Therefore, in the air bag apparatus according to the first aspect, when the child restraining system detecting means detects that a child restraining system is mounted on the passenger seat, the inflator is prevented from operating. Accordingly, in the case where the child restraining system is mounted on the passenger seat, the air bag apparatus does not operate even when the deceleration of the vehicle reaches a predetermined level due to an abrupt deceleration. This decreases the likelihood of having to replace the air bag apparatus after a traffic accident, thereby decreasing repair costs.

An air bag apparatus for a passenger seat according to a second aspect of the present invention includes passenger detecting means for detecting whether a passenger occupies the passenger seat, webbing application detecting means for detecting whether a webbing for the passenger seat is in an applied state, child restraining system detecting means for detecting whether a child restraining system is mounted on the passenger seat, a vehicle speed sensor for detecting a vehicle speed, and an inflator controller. The inflator controller prevents an inflator for expanding an air bag body from operating in a state in which the vehicle speed detected by the vehicle speed sensor is lower than a predetermined speed when the passenger detecting means detects that a passenger occupies the passenger seat, the webbing application detecting means detects that the webbing is in the applied state, and the child restraining system detecting means detects that the child restraining system is mounted on the passenger seat. The inflator controller allows the inflator to operate even in the state in which the vehicle speed detected by the vehicle speed sensor is lower than the predetermined speed when the passenger detecting means detects that a passenger occupies the passenger seat, the webbing application detecting means detects that the webbing is not in the applied state, and the child restraining system detecting means detects that no child restraining system is mounted on the passenger seat.

Therefore, in the air bag apparatus according to the second aspect, when the passenger detecting means detects that a passenger occupies the passenger seat, the webbing application detecting means detects that the webbing for the passenger seat is in the applied state, and the child restraining system detecting means detects that no child restraining system is mounted on the passenger seat, the inflator is prevented from operating if the vehicle speed detected by the vehicle speed sensor is lower than a predetermined speed. Further, when the passenger detecting means detects that a passenger occupies the passenger seat, the webbing application detecting means detects that the webbing is not in the applied state, and the child restraining system detecting means detects that no child restraining system is mounted on the passenger seat, the inflator is allowed to operate even when the vehicle speed detected by the vehicle speed sensor is lower than the predetermined speed.

Accordingly, in the case where a child restraining system is mounted on the passenger seat, the air bag apparatus does not operate even when the deceleration of the vehicle reaches a predetermined level due to an abrupt deceleration. This decreases the likelihood of having to replace the air bag apparatus after a traffic accident, thereby decreasing repair costs.

In addition, when the webbing has been applied to a passenger sitting on the passenger seat, the inflator is operated only when the vehicle speed exceeds the predetermined speed, so that the inflator does not operate when the vehicle speed is lower than the predetermined speed. This also decreases the likelihood of having to replace the air bag apparatus after a traffic accident, thereby decreasing repair costs.

According to a third aspect of the present invention, the webbing application detecting means of the air bag apparatus according to the second aspect is a pull-out amount detecting means which detects an amount of the webbing which is pulled out from a webbing retractor, or a buckle engagement detecting switch which detects whether a tongue plate coupled with the webbing is engaged with a buckle with which the tongue plate is to be engaged.

Therefore, in the third aspect, when the pull-out amount detecting means detects that the webbing is pulled out by an amount greater than or equal to a predetermined amount, it is judged that the webbing for the passenger seat is in the applied state. When the pull-out amount detecting means detects that the pulled-out amount of the webbing is less than the predetermined amount, it is judged that the webbing for the passenger seat is not in the applied state. Alternatively, when the buckle engagement detecting switch detects that the tongue plate is in engagement with the buckle, it is judged that the webbing for the passenger seat is in the applied state, and when the buckle engagement detecting switch does not detect the engagement between the tongue plate and the buckle, it is judged that the webbing for the passenger seat is not in the applied state.

According to a fourth aspect of the present invention, the child restraining system detecting means of the air bag apparatus according to the first or the second aspect is a retractor mode detecting switch which detects whether a webbing retractor for the passenger seat is in an automatic locking retractor mode or in an emergency locking retractor mode.

Therefore, in the fourth aspect, when the retractor mode detecting switch detects that the webbing retractor is in the automatic locking retractor mode, it is judged that the child restraining system is mounted on the passenger seat, and when the retractor mode detecting switch detects that the webbing retractor is in the emergency locking retractor mode, it is judged that no child restraining system is mounted on the passenger seat.

DESCRIPTION OF THE PREFERRED EMBODIMENT

Figure 1:
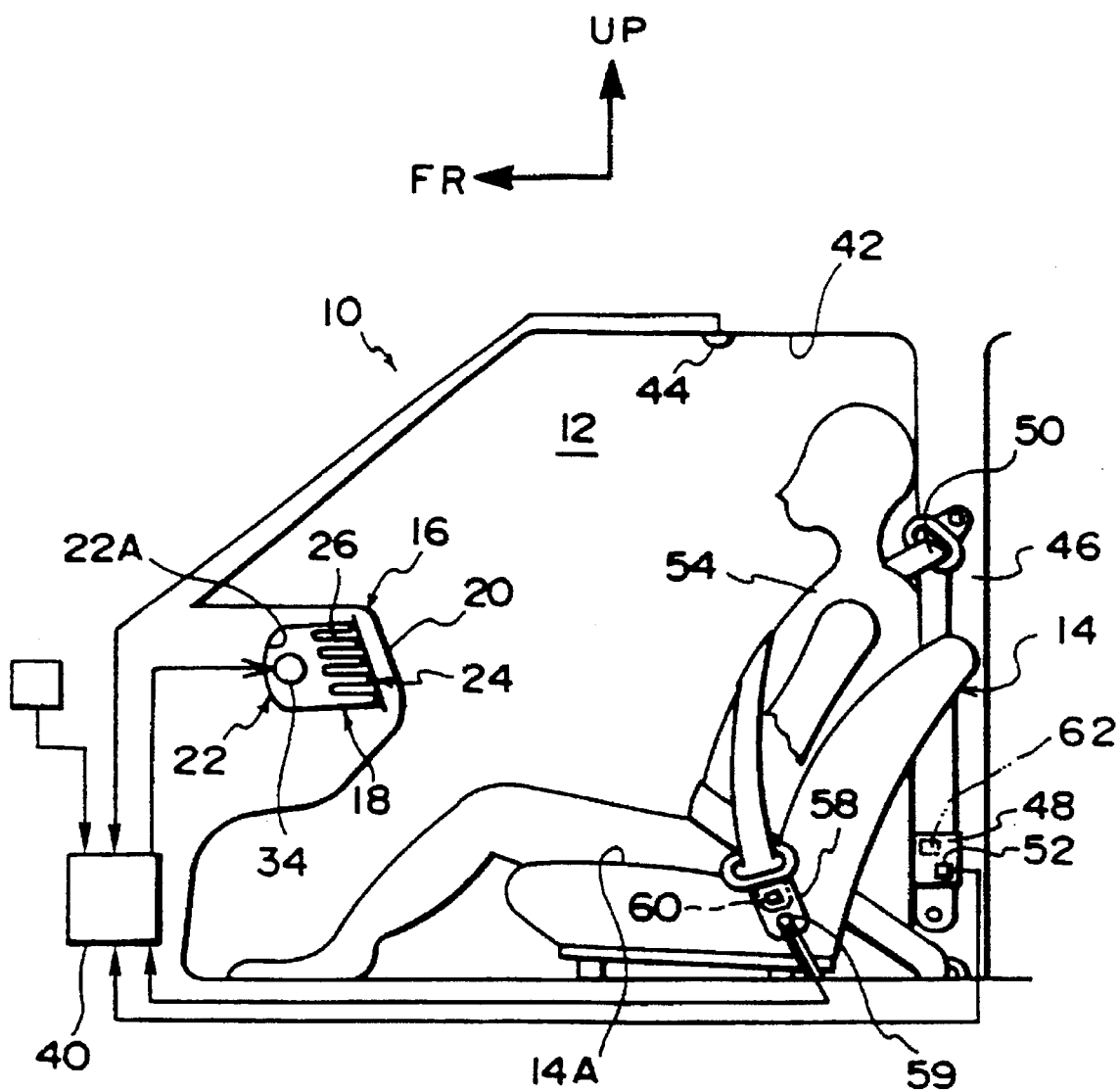
FIG. 1 is a schematic side view showing an air bag apparatus for a front passenger seat according to an embodiment of the present invention.

An air bag apparatus for a front passenger seat according to an embodiment of the present invention will be described with reference to the accompanying drawings.

In the drawings, arrow FR indicates the forward direction of a vehicle 10 while arrow UP indicates the upward direction of the vehicle 10.

Figure 3:
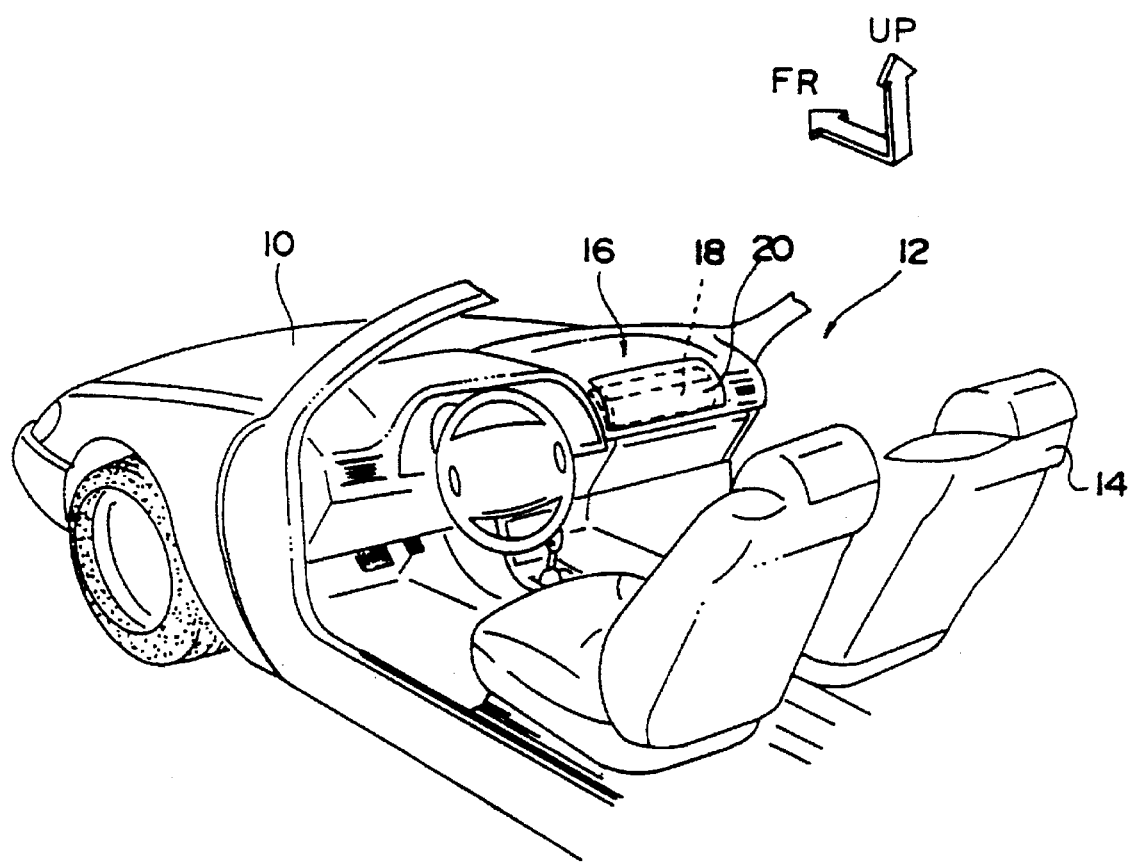
FIG. 3 is a perspective view of a dashboard, as viewed from the left-back side of the vehicle, in which the air bag apparatus according to the embodiment of the present invention is built.

As shown in FIG. 3, in the vehicle 10 according the present embodiment, a dashboard 16 is disposed in the vehicle interior such that it is located in front of a front passenger seat 14. An air bag apparatus 18 for the front passenger seat 14 is disposed at the back of the dashboard 16. The air bag apparatus 18 has a rectangular shape extending in the widthwise direction of the vehicle 10. A portion of the dashboard 16 which faces the air bag apparatus 18 is formed to serve as an air bag cover portion 20 which has a rectangular shape extending in the widthwise direction of the vehicle 10.

As shown in FIG. 1, a case 22 of the air bag apparatus 18 has a substantially U-shaped cross section when viewed from a side of the vehicle 10. An opening 24 is formed in the case 22 such that the opening 24 is directed toward the rear of the vehicle 10 while being upwardly tilted. The circumferential edge of the opening of an air bag body 26 is fixed to the inner circumference of the opening 24.

A cylindrical inflator 34 is disposed in the vicinity of the bottom portion 22A of the case 22 such that the inflator 34 extends in the widthwise direction of the vehicle 10. The inflator 34 is filled with a gas generating substance which is provided with igniting means. Further, the air bag apparatus 18 is provided with an acceleration sensor 200 (see FIGS. 6A and 6B). The acceleration sensor 200 outputs an electrical signal when it detects an abrupt deceleration equal to or greater than a predetermined level. The inflator 34 and the acceleration sensor 200 are connected to each other via a switch circuit 202 shown in FIGS. 6A and 6B which is opened and closed by an inflator controller 40. Accordingly, when the vehicle 10 abruptly decelerates at a deceleration equal to or greater than the predetermined level in a state in which the switch circuit 202 is closed, the gas generating substance is ignited by the igniting means when the acceleration sensor 200 operates and outputs an electrical signal, so that the gas generating substance burns to generate a gas. Due to the gas thus generated, the air bag body 26 housed in a folded state in the case 22 located in the vicinity of the opening 24 inflates, and unfolds toward the vehicle interior while breaking the air bag cover portion 20 of the dashboard 16.

The inflator controller 40 including a microcomputer prohibits the operation of the inflator 34 by opening the switch circuit 202 (FIGS. 6A and 6B) disposed between the acceleration sensor 200 and the inflator 34 when below-described predetermined conditions are satisfied.

An infrared sensor 44 serving as a passenger detecting means is attached to a roof 42 such that the sensor 44 is located above the seat cushion 14A of the front passenger seat 14. The infrared sensor 44 is connected to the inflator controller 40. The infrared sensor 44 detects infrared rays from a passenger on the seat cushion 14A, and outputs to the inflator controller 40 a signal indicating the detection of infrared rays.

Figure 2:
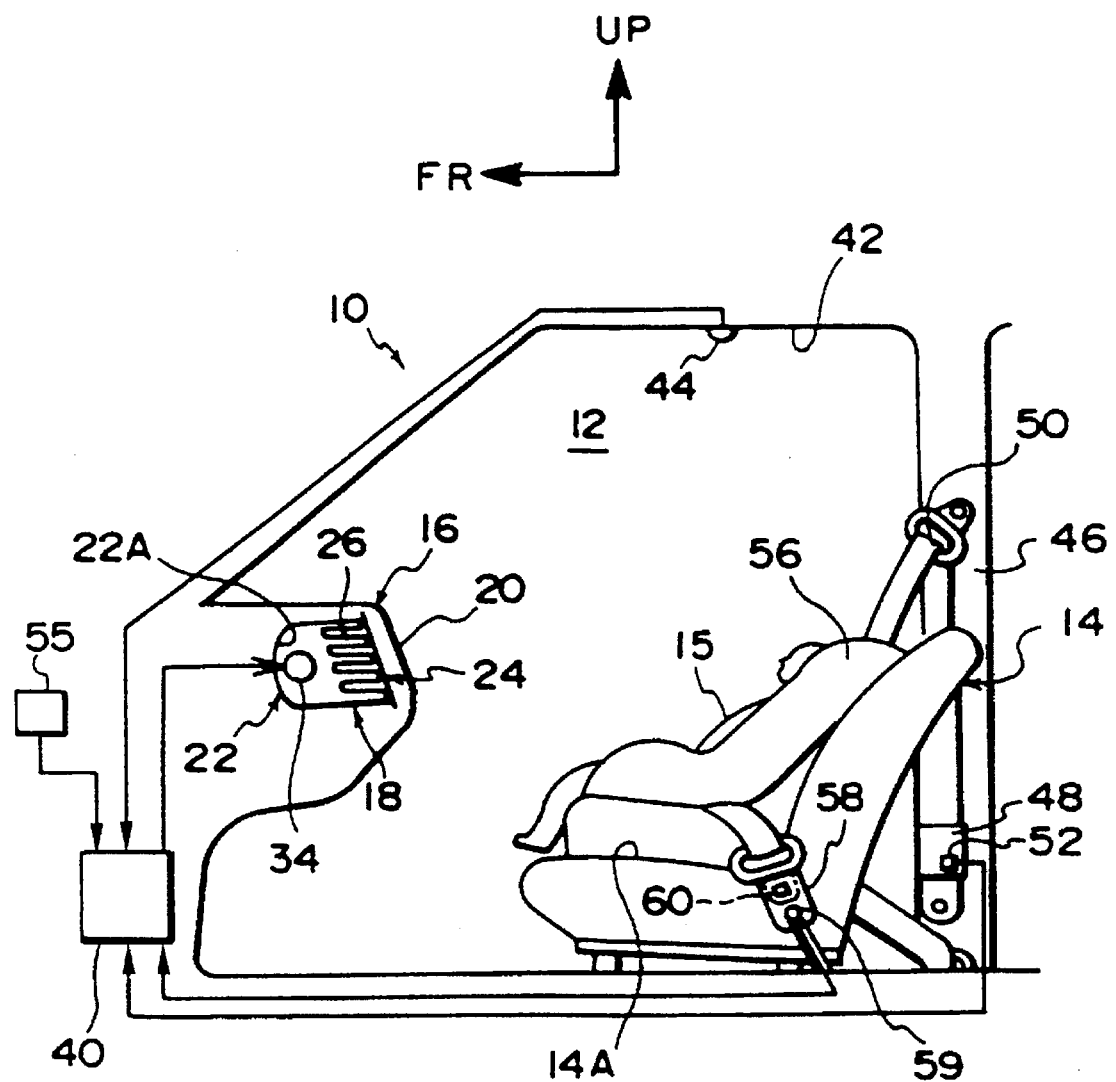
FIG. 2 is a schematic side view showing a state in which a child restraining system is mounted on a front passenger seat at which the air bag apparatus according to the embodiment of the present invention is provided.

A webbing retractor 48 is disposed at the lower end of a center pillar 46, and a webbing 50 is rolled in the webbing retractor 48 such that it can be retractably pulled out therefrom. The webbing retractor 48 can be switched into an automatic locking retractor mode (ALR) and an emergency locking retractor mode (ELR). When an adult 54 sits on the front passenger seat 14 as shown in FIG. 1, the operating mode of the webbing retractor 48 is switched to the ELR mode. When a child restraining system 56 for holding a child 15 is fixed to the front passenger seat 14 by the webbing 50 as shown in FIG. 2, the operating mode of the webbing retractor 48 is switched to the ALR mode. The webbing retractor 48 is provided with a retractor mode detecting switch 52 serving as a child restraining system detecting means which responds to changeover between the ALR mode and the ELR mode. The retractor mode detecting switch 52 is connected to the inflator controller 40 so as to input to the inflator controller 40 a signal indicating whether the webbing retractor 48 is in the ALR mode or the ELR mode.

Figure 8B:
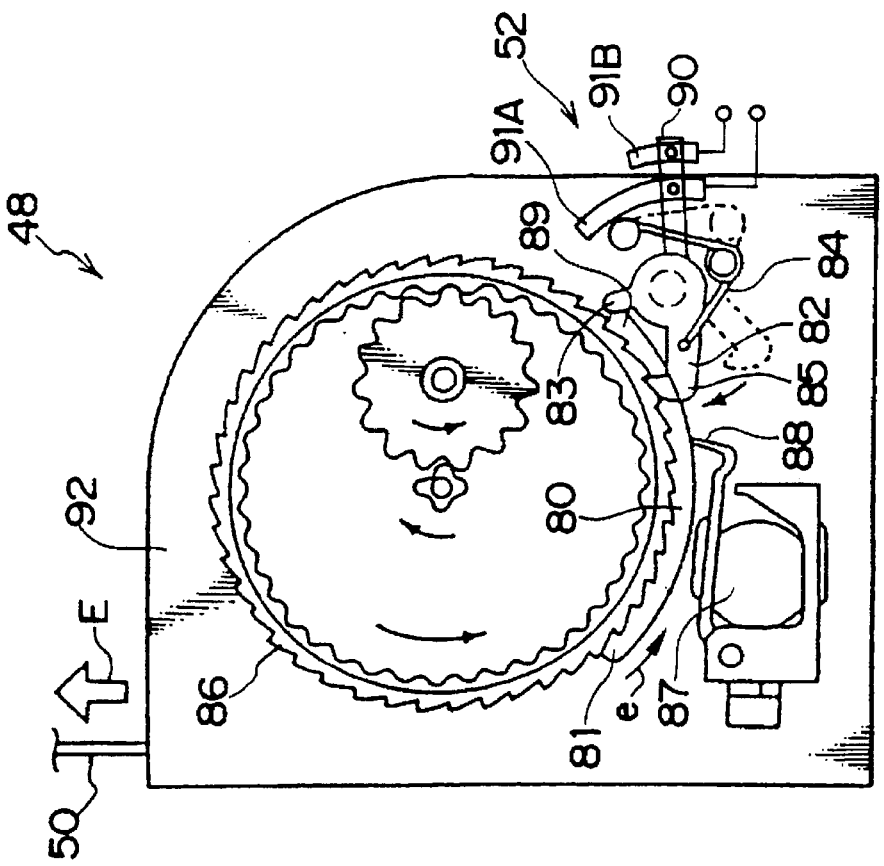
FIG. 8B shows the webbing retractor which is in an automatic locking retractor mode.
Figure 8A:
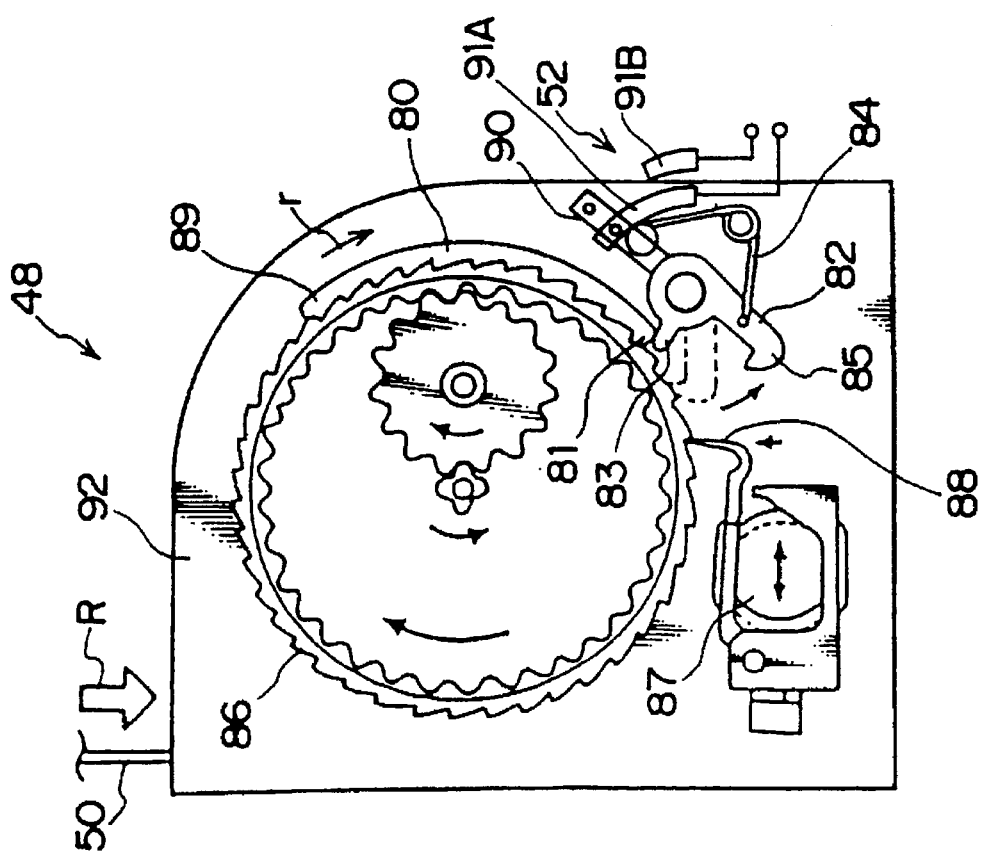
FIG. 8A shows a webbing retractor which is in an emergency locking retractor mode.

The changeover between the ALR mode and the ELR mode will be briefly described with reference to FIGS. 8A and 8B. When the webbing 50 which has been pulled out is wound by the webbing retractor 48 in the direction indicated by arrow R in FIG. 8A, respective gear wheels rotate in the respective directions indicated by arrows in FIG. 8A. With this operation, a pushing member 80 rotates in the direction indicated by arrow r. When substantially the entire amount of the webbing 50 is wound by the webbing retractor 48, a first end portion 81 of the pushing member 80 pushes a projection 83 of a first pawl 82 to rotate the first pawl 82 against the urging force of a spring 84, so that a claw portion 85 of the first pawl 82 is separated from an outer gear wheel 86. This state is the ELR mode. When the webbing 50 is pulled out in a direction opposite to the direction indicated by arrow R and a tongue plate 60 is engaged with a buckle 58 in the ELR mode, the adult passenger is held by the webbing 50. When the vehicle 10 abruptly decelerates in such a state, an inertia member 87 moves to raise a second pawl 88, so that the second pawl 88 engages with the outer gear wheel 86 to prevent the webbing 50 from being pulled out. On the other hand, when the webbing 50 which has been wound is pulled out from the webbing retractor 48 in the direction indicated by arrow E in FIG. 8B, the respective gear wheels rotate in the respective directions indicated by arrows in FIG. 8B. With this operation, the pushing member 80 rotates in the direction indicated by arrow e. When substantially the entire amount of the webbing 50 is pulled out from the webbing retractor 48, a second end portion 81 of the pushing member 80 pushes the projection 83 of the first pawl 82 to rotate the first pawl 82 against the urging force of the spring 84, so that the claw portion 85 of the first pawl 82 is engaged with the outer gear wheel 86. This state is the ALR mode. In this mode, the webbing 50 is allowed to be wound by the webbing retractor 48 but is prevented from being pulled out. When the child restraining system 56 is webbing has been applied to an adult passenger, the inflator 34 is prevented from operating when the vehicle speed is lower than the predetermined level and is allowed to operate when the vehicle speed becomes equal to or greater than the predetermined level.

Figure 6A:
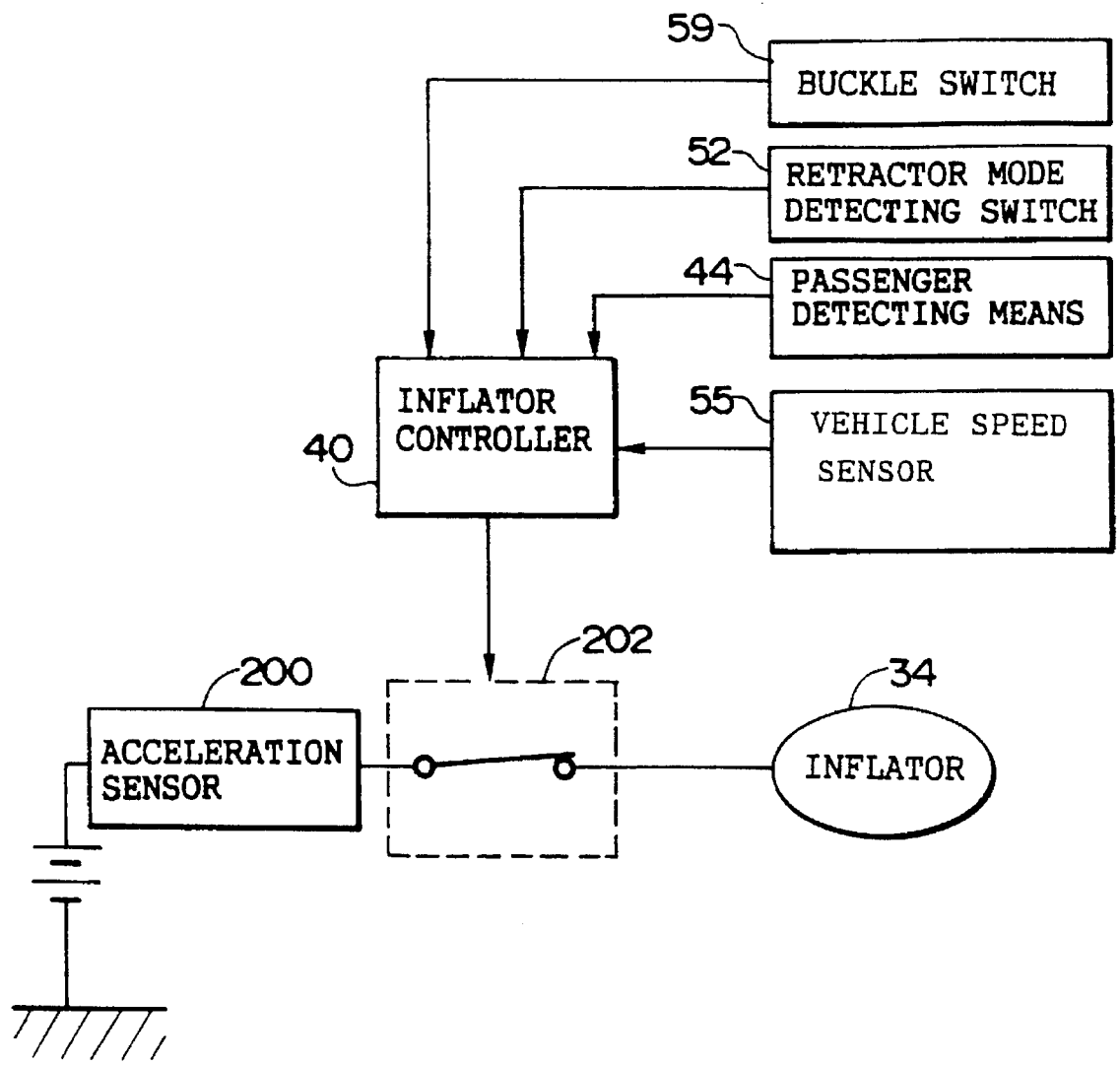
FIG. 6A is a block diagram showing a part of a control circuit of the air bag apparatus according to the embodiment of the present invention in which a switch circuit is closed.

When it is judged in step 102 that the buckle switch 59 is not in the ON state, i.e., that the webbing 50 for the front passenger seat 14 has not been applied, the processing moves to step 108 in which the switch circuit 202 connecting the acceleration sensor 200 and the inflator 34 is closed, as shown in FIG. 6A, irrespective of the vehicle speed detected by the vehicle speed sensor 55. With this operation, the inflator 34 is allowed to operate when the deceleration of the vehicle 10 reaches the predetermined level at which the acceleration sensor 200 operates.

The reason why the above-described operation is required is that when the webbing 50 has not been applied to the adult passenger 54 sitting in the front passenger seat 14, it is necessary to operate the inflator 34 even when the vehicle speed is lower than the predetermined level so as to protect the passenger.

As described above, in the air bag apparatus for a front passenger seat according the present embodiment, when the child restraining system 56 is mounted on the front passenger seat 14, the switch circuit 202 is opened. Accordingly, the inflator 34 does not operates even when a deceleration equal to or greater than the predetermined the buckle switch 59 is turned on. The buckle switch 59 is connected to the inflator controller 40 to input thereto a signal indicating whether the tongue plate 60 is engaged with the buckle 58.

Moreover, a vehicle speed sensor 55 is disposed in the body 10. The vehicle speed sensor 55 is connected to the inflator controller 40 to transmit thereto a signal indicating the present speed of the vehicle 10.

Next, the operation of the present embodiment will be described.

Figure 4:
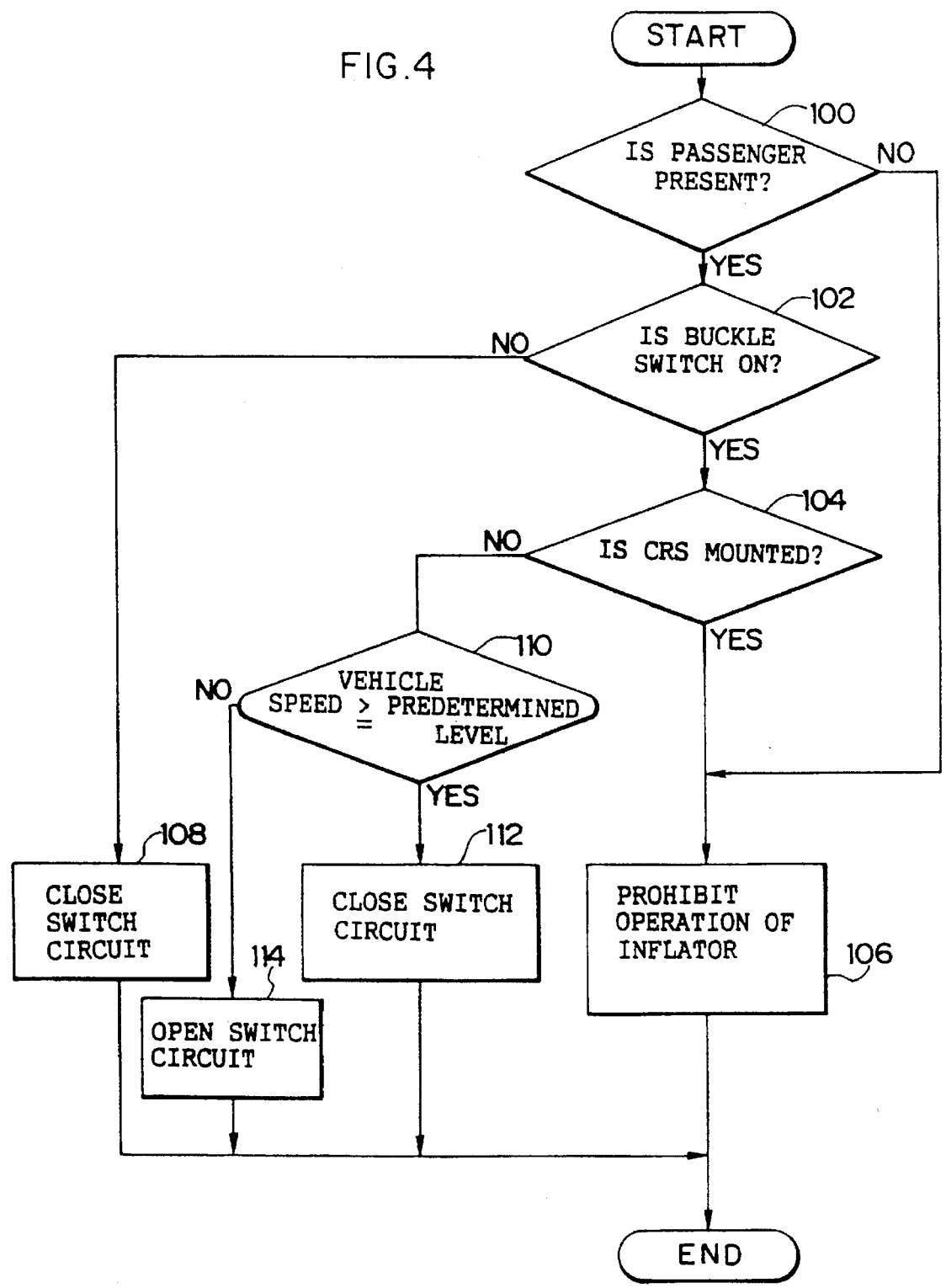
FIG. 4 is a flowchart showing the inflator control operation of the air bag apparatus according to the embodiment of the present invention.
Figure 5:
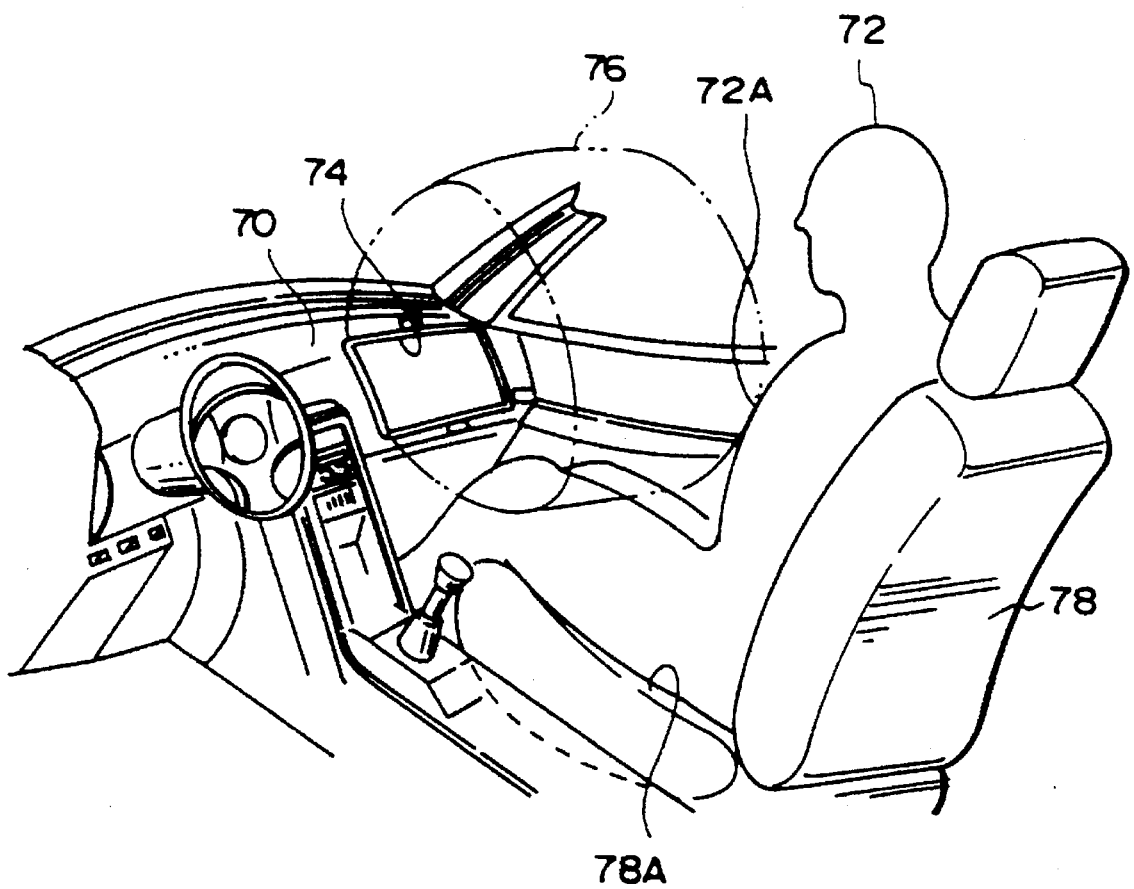
FIG. 5 is a perspective view of a dashboard, as viewed from the left-back side of the vehicle, in which a conventional air bag apparatus for a front passenger seat is built.
Figure 6B:
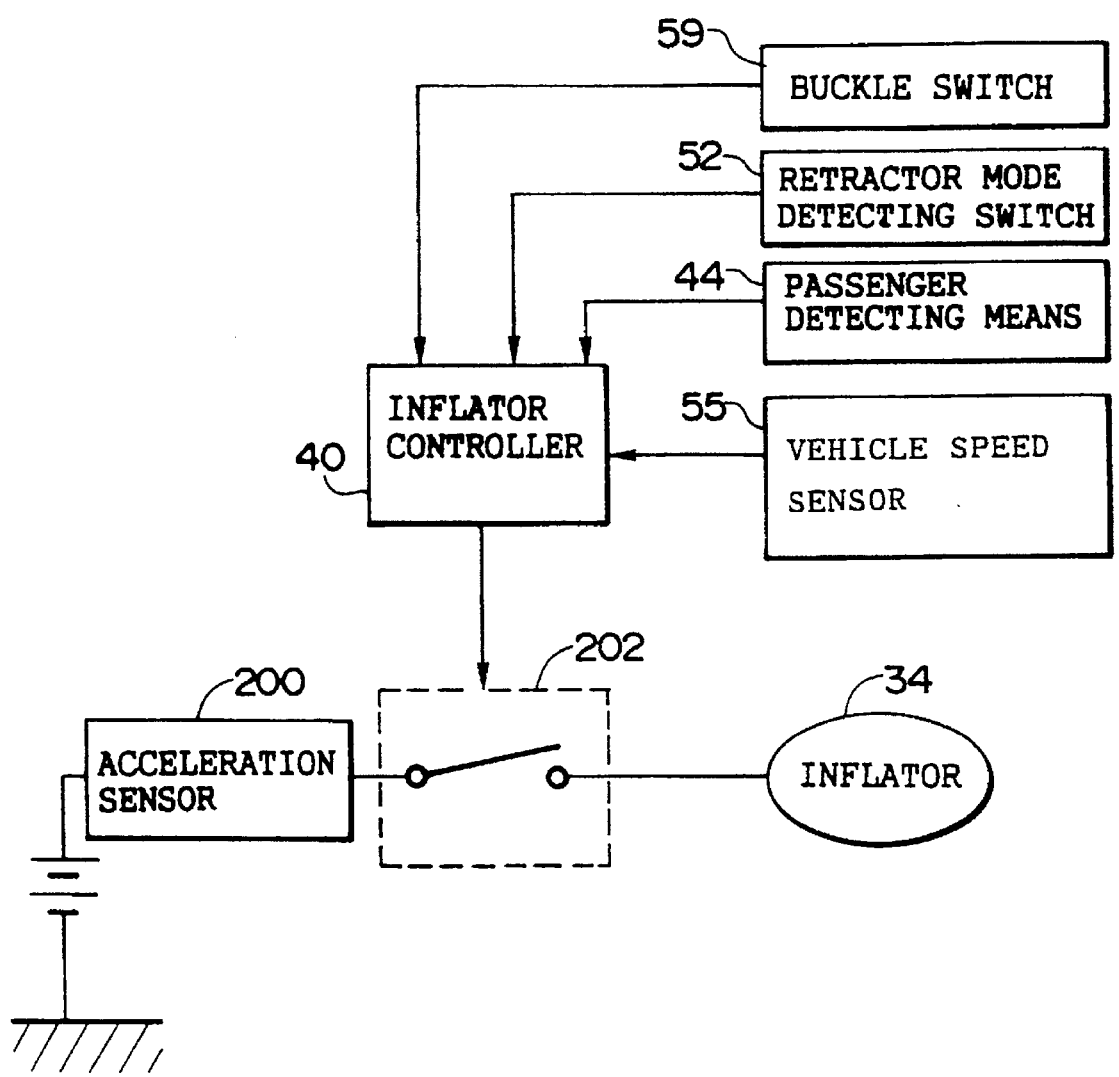
FIG. 6B is a block diagram showing a part of the control circuit of the air bag apparatus according to the embodiment of the present invention in which the switch circuit is opened.

As shown in the flowchart of FIG. 4, in the air bag apparatus according the present embodiment, the inflator controller 40 judges in step 100 whether the front passenger seat 14 is occupied by a passenger, i.e., an adult 54 or a child 15 on the child restraining system 56. This judgment is made on the basis of the detection signal from the infrared sensor 44. When it is judged in step 100 that no passenger occupies the front passenger seat 14, operation of the inflator 34 is prohibited in step 106. That is, the switch circuit 202 is opened as shown in FIG. 6B.

On the other hand, when it is judged in step 100 that a passenger occupies the front passenger seat 14, it is judged in step 102 whether the buckle switch 59 is in the ON state. When it is judged in step 102 that the buckle switch 59 is in the ON state, i.e., that the webbing 50 for the front passenger seat 14 has been applied, the processing moves to step 104 in which it is judged whether the child restraining system (CRS) 56 is mounted on the front passenger seat 14. This judgment is made by detecting by the retractor mode detecting switch 52 whether the webbing retractor 48 is in the ALR mode or the ELR mode. When it is detected in step 104 that the webbing retractor 48 is in the ALR mode, it is judged that the child restraining system 56 is fixed to the front passenger seat 14 by the webbing 50. In such a case, operation of the inflator 34 is prohibited in step 106.

When it is detected in step 104 that the webbing retractor 48 is in the ELR mode, it is judged in step 110 whether the vehicle speed detected by the vehicle speed sensor 55 is equal to or greater than a predetermined level (for example, 25 km/h). When it is judged that the detected vehicle speed is equal to or greater than a predetermined level (for example, 25 km/h), the switch circuit 202 connecting the acceleration sensor 200 and the inflator 34 is closed in step 112, as shown in FIG. 6A. When the acceleration sensor 200 detects (or operates in response to) an abrupt deceleration greater than a predetermined level in this state, a detection signal is transmitted from the acceleration sensor 200 to the inflator 34 via the switch circuit 202, so that the inflator 34 is operated to expand the air bag body 26. When it is judged in step 110 that the detected vehicle speed is lower than the predetermined level, the switch circuit 202 connecting the acceleration sensor 200 and the inflator 34 is opened in step 114, as shown in FIG. 6B. In this manner, in the case in which the held by the webbing 50 in the ALR mode, the webbing 50 is prevented from being pulled out, so that the child restraining system 56 can always be prevented from moving. To cancel the ALR mode, the tongue plate 60 is disengaged and released from the buckle 58. When the tongue plate 60 is released, the webbing 50 is wound around a winding shaft of the webbing retractor 48 by the urging force of an unillustrated spring. When substantially the entire amount of the webbing 50 is wound, the operating mode is switched to the ELR mode shown in FIG. 8A.

In the present invention, the changeover between the ALR mode and the ELR mode is detected by the retractor mode detecting switch 52 which outputs to the inflator controller 40 a signal indicating whether the webbing retractor 48 is in the ALR mode or the ELR mode. That is, the retractor mode detecting switch 52 is provided near the first pawl 82, and includes a movable contact member 90 which rotates together with the first pawl 82, and a pair of stationary contact members 91A and 91B provided on a frame 92 of the webbing retractor 48. In the ELR mode shown in FIG. 8A, the retractor mode detecting switch 52 is in its OFF state, while in the ALR mode shown in FIG. 8B, the retractor mode detecting switch 52 is in its ON state. A signal indicating one of these states is input to the inflator controller 40.

A buckle switch 59 serving as a buckle engagement detecting means is provided on the buckle 58 for the webbing 50. When the tongue plate 60 is engaged with the buckle 58, level acts on the acceleration sensor 200. This decreases the likelihood of having to replace the air bag, apparatus after a traffic accident, thereby decreasing repair costs.

Further, when the adult passenger 54 sitting on the passenger seat 14 has fastened the webbing 50 (i.e., has applied the webbing 50 to himself/herself), the inflator 34 is operated only when the vehicle speed becomes equal to or greater than the predetermined speed, so that the inflator 34 does not operate when the vehicle speed is lower than the predetermined speed. This also decreases the likelihood of having to replace the air bag apparatus after a traffic accident, thereby decreasing repair costs.

In the air bag apparatus for a front passenger seat according the present embodiment, the buckle switch 59 is used as a webbing application detecting means. Accordingly, it is unnecessary to provide a separate webbing application detecting means. Further, as the retractor mode detecting switch 52 is used as a child restraining system detecting means, it is unnecessary to provide a separate child restraining system detecting means.

In the present embodiment, the inflator controller 40 judges that the webbing 50 for the front passenger seat 14 has been fastened when it is detected by the buckle switch 59 serving as a buckle engagement detecting means that the tongue plate 60 is engaged with the buckle 58. Alternatively, a webbing pull-out amount detecting sensor 62 may be provided on the webbing retractor 48, as indicated by the imaginary lines in FIG. 1. The webbing pull-out amount detecting sensor 62 serves as a webbing pull-out amount detecting means which detects the pulled out amount of the webbing 50 for the front passenger seat 14. When it is detected by the webbing pull-out amount detecting sensor 62 that the webbing 50 for the front passenger seat 14 is pulled out by an amount equal to or greater than a predetermined amount, it is judged that the webbing 50 for the front passenger seat 14 is in the applied state. When it is detected by the webbing pull-out amount detecting sensor 62 that the pulled amount of the webbing 50 for the front passenger seat 14 is less than the predetermined amount, it is judged that the webbing 50 for the front passenger seat 14 is not in the applied state.

Figure 7:
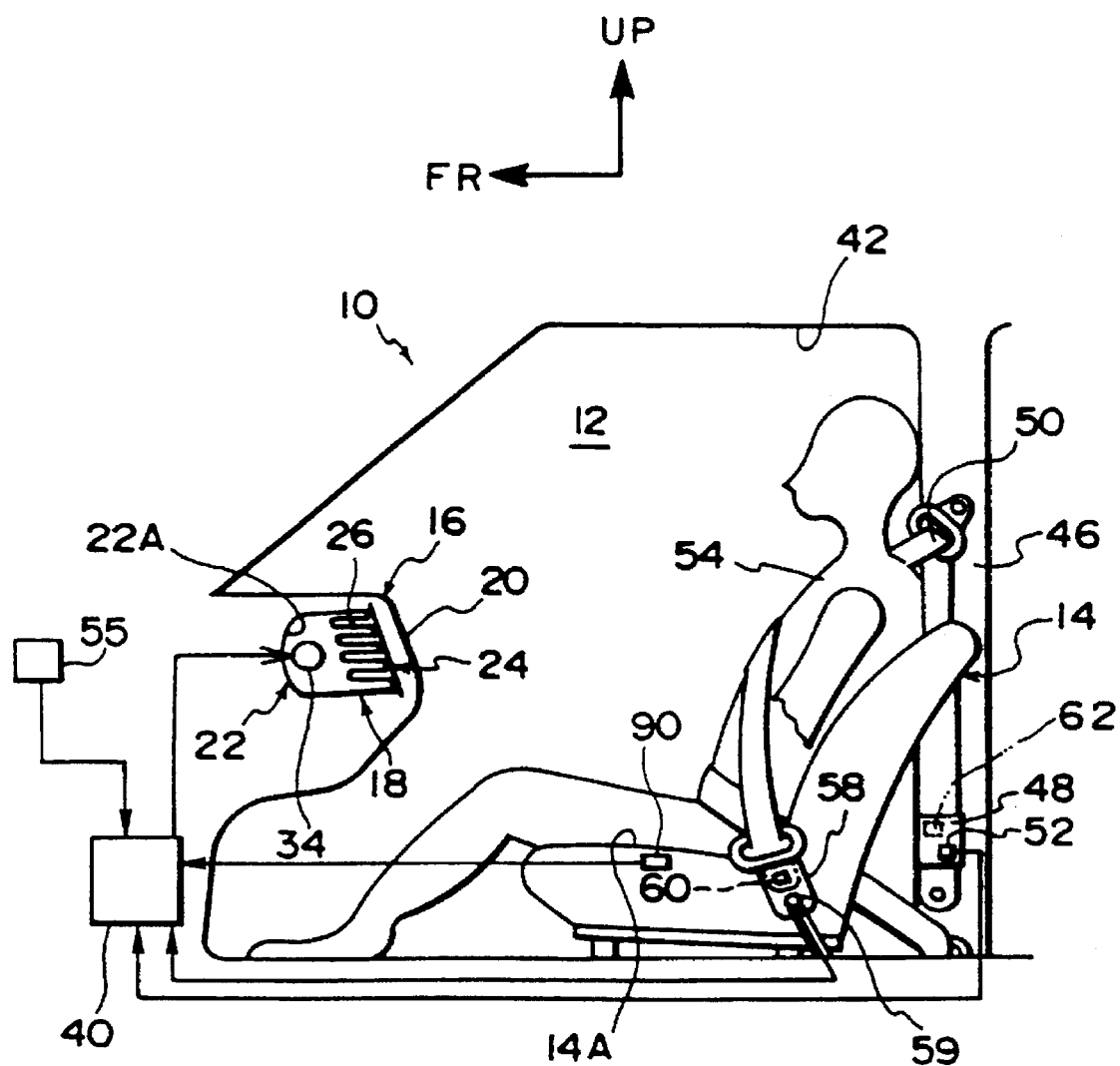
FIG. 7 shows a modification of the present invention in which a pressure sensor is used as a passenger detecting means.

Although the passenger detecting means is the infrared sensor 44 in the present embodiment, the passenger detecting means is not limited thereto and other sensors such as a pressure sensor 90 which is provided in the seat cushion 14B of the front passenger seat 14, as shown in FIG. 7, may be used.

In the present embodiment, the present invention is applied to the air bag apparatus for the front passenger seat. However, the present invention may be applied to an air bag apparatus for a rear passenger seat.

What is claimed is:

1. An air bag apparatus for a passenger seat, comprising:

child restraining system detecting means for detecting whether a child restraining system is mounted on a passenger seat; and an inflator controller for preventing an inflator for an air bag body from operating when it is detected by said child restraining system detecting means that said child restraining system is mounted on said passenger seat, wherein said child restraining system detecting means comprises a retractor mode detecting switch which detects whether a webbing retractor for said passenger seat is in an automatic locking retractor mode or in an emergency locking retractor mode, and when it is detected by said retractor mode detecting switch that said webbing retractor is in the automatic locking retractor mode, it is detected that said child restraining system is mounted on said passenger seat.

2. An air bag apparatus for a passenger seat according to claim 1, further comprising:

an acceleration sensor for detecting an abrupt deceleration of the vehicle equal to or greater than a predetermined level and for outputting a signal to said inflator so as to operate said inflator; and a switch circuit interposed between said acceleration sensor and said inflator and being opened and closed by said inflator controller, wherein said inflator controller prohibits operation of said inflator by opening said switch circuit.

3. An air bag apparatus for a passenger seat according to claim 1, further comprising:

passenger detecting means for detecting whether a passenger occupies said passenger seat, wherein operation of said inflator is prohibited by said inflator controller when it is detected by said passenger detecting means that no passenger occupies said passenger seat.

4. An air bag apparatus for a passenger seat according to claim 3, further comprising:

an acceleration sensor for detecting an abrupt deceleration of the vehicle equal to or greater than a predetermined level and for outputting a signal to said inflator so as to operate said inflator; and a switch circuit interposed between said acceleration sensor and said inflator and being opened and closed by said inflator controller, wherein said inflator controller prohibits operation of said inflator by opening said switch circuit.

5. An air bag apparatus for a passenger seat according to claim 3, wherein said passenger detecting means is one of an infrared sensor for detecting infrared rays emitted from a passenger, and a pressure sensor for detecting a pressure produced by said passenger.

6. An air bag apparatus for a passenger seat, comprising:

passenger detecting means for detecting whether a passenger occupies said passenger seat;

webbing application detecting means for detecting whether a webbing for said passenger seat is in an applied state;

child restraining system detecting means for detecting whether a child restraining system is mounted on said passenger seat;

a vehicle speed sensor for detecting a vehicle speed; and an inflator controller for preventing an inflator for expanding an air bag body from operating in a state in which the vehicle speed detected by said vehicle speed sensor is lower than a predetermined speed when said passenger detecting means detects that a passenger occupies said passenger seat, said webbing application detecting means detects that said webbing is in the applied state, and said child restraining system detecting means detects that no child restraining system is mounted on said passenger seat, and for allowing said inflator to operate even in the state in which the vehicle speed detected by said vehicle speed sensor is lower than the predetermined speed when said passenger detecting means detects that a passenger occupies said passenger seat, said webbing application detecting means detects that said webbing is in an unapplied state, and said child restraining system detecting means detects that no child restraining system is mounted on said passenger seat, wherein said child restraining system detecting means comprises a retractor mode detecting switch which detects whether a webbing retractor for said passenger seat is in an automatic locking retractor mode or in an emergency locking retractor mode, and when it is detected by said retractor mode detecting switch that said webbing retractor is in the automatic locking retractor mode, it is detected that said child restraining system is mounted on said passenger seat.

7. An air bag apparatus for a passenger seat, comprising:

passenger detecting means for detecting whether a passenger occupies said passenger seat;

webbing application detecting means for detecting whether a webbing for said passenger seat is in an applied state;

child restraining system detecting means for detecting whether a child restraining system is mounted on said passenger seat;

a vehicle speed sensor for detecting a vehicle speed; and an inflator controller for preventing an inflator for expanding an air bag body from operating in a state in which the vehicle speed detected by said vehicle speed sensor is lower than a predetermined speed when said passenger detecting means detects that a passenger occupies said passenger seat, said webbing application detecting means detects that said webbing is in the applied state, and said child restraining system detecting means detects that no child restraining system is mounted on said passenger seat, and for allowing said inflator to operate even in the state in which the vehicle speed detected by said vehicle speed sensor is lower than the predetermined speed when said passenger detecting means detects that a passenger occupies said passenger seat, said webbing application detecting means detects that said webbing is in an unapplied state, and said child restraining system detecting means detects that no child restraining system is mounted on said passenger seat, wherein said webbing application detecting means is one of a pull-out amount detecting means which detects an amount of said webbing which is pulled out from a webbing retractor for said passenger seat, and a buckle engagement detecting switch which detects whether a tongue plate coupled with said webbing is engaged with a buckle with which said tongue plate is to be engaged.

8. An air bag apparatus for a passenger seat according to claim 7, further comprising:

an acceleration sensor for detecting an abrupt deceleration of the vehicle equal to or greater than a predetermined level and for outputting a signal to said inflator so as to operate said inflator; and a switch circuit interposed between said acceleration sensor and said inflator and being opened and closed by said inflator controller, wherein said inflator controller prohibits operation of said inflator by opening said switch circuit.

9. An air bag apparatus for a passenger seat according to claim 7, wherein said passenger detecting means is one of an infrared sensor for detecting infrared rays emitted from a passenger, and a pressure sensor for detecting a pressure produced by said passenger.

10. An air bag apparatus for a passenger seat according to claim 7, wherein said child restraining system detecting means comprises a retractor mode detecting switch which detects whether a webbing retractor for said passenger seat is in an automatic locking retractor mode or in an emergency locking retractor mode, and when it is detected by said retractor mode detecting switch that said webbing retractor is in the automatic locking retractor mode, it is detected that said child restraining system is mounted on said passenger seat.

11. An air bag apparatus for a passenger seat according to claim 10, further comprising:

an acceleration sensor for detecting an abrupt deceleration of the vehicle equal to or greater than a predetermined level and for outputting a signal to said inflator so as to operate said inflator; and a switch circuit interposed between said acceleration sensor and said inflator and being opened and closed by said inflator controller, wherein said inflator controller prohibits operation of said inflator by opening said switch circuit.

12. An air bag apparatus for a passenger seat according to claim 11, wherein said passenger detecting means is one of an infrared sensor for detecting infrared rays emitted from a passenger, and a pressure sensor for detecting a pressure produced by said passenger.

13. An air bag apparatus for a passenger seat, comprising:

an air bag body which is expanded by an operation of an inflator;

an acceleration sensor for detecting an abrupt deceleration of a vehicle equal to or greater than a predetermined level and for outputting a signal to said inflator so as to operate said inflator;

switch means interposed between said acceleration sensor and said inflator and being opened and closed, said switch means stopping transmission of the signal from said acceleration sensor to said inflator in an opened state;

child restraining system detecting means for detecting whether a child restraining system is mounted on a passenger seat; and an inflator controller for opening said switch means so as to prevent the inflator from operating when it is detected by said child restraining system detecting means that said child restraining system is mounted on said passenger seat, wherein said child restraining system detecting means comprises a retractor mode detecting switch which detects whether a webbing retractor for said passenger seat is in an automatic locking retractor mode or in an emergency locking retractor mode, and when it is detected by said retractor mode detecting switch that said webbing retractor for said passenger seat is in the automatic locking retractor mode, it is detected that said child restraining system is mounted on said passenger seat.

14. An air bag apparatus for a passenger seat according to claim 13, further comprising:

passenger detecting means for detecting whether a passenger occupies said passenger seat, wherein said inflator controller opens said switch means when it is detected by said passenger detecting means that no passenger occupies said passenger seat.

15. An air bag apparatus for a passenger seat according to claim 14, wherein said passenger detecting means is one of an infrared sensor for detecting infrared rays emitted from a passenger, and a pressure sensor for detecting a pressure produced by said passenger.

16. An air bag apparatus for a passenger seat according to claim 14, further comprising webbing application detecting means for detecting whether said webbing for said passenger seat is in an applied state, wherein said inflator controller closes said switch means to allow the signal from said acceleration sensor to be transmitted to said inflator when it is detected by said passenger detecting means that a passenger is present and it is detected by said webbing application detecting means that said webbing is in an unapplied state.

17. An air bag apparatus for a passenger seat according to claim 16, wherein said webbing application detecting means is one of a pull-out amount detecting means which detects an amount of said webbing which is pulled out from a webbing retractor for said passenger seat, and a buckle engagement detecting switch which detects whether a tongue plate coupled with said webbing is engaged with a buckle with which said tongue plate is to be engaged.

* * * * *